United States Patent [19]
Wächter et al.

[11] Patent Number: 6,036,224
[45] Date of Patent: Mar. 14, 2000

[54] IMPACT SENSOR CONFIGURATION FOR A MOTOR VEHICLE

[75] Inventors: Michael Wächter, Regensburg; Marten Swart; Klemens Paul, both of Obertraubling; Anton Anthofer, Freihung; Gerhard Mader, Thalmassing; Richard Vogt, Sinzing, all of Germany

[73] Assignee: Siemens Aktiengesellschaft, Munich, Germany

[21] Appl. No.: 09/096,980

[22] Filed: Jun. 12, 1998

Related U.S. Application Data

[63] Continuation of application No. PCT/DE96/02354, Dec. 9, 1996.

[30] Foreign Application Priority Data

Dec. 12, 1995 [DE] Germany .................. 195 46 358

[51] Int. Cl.⁷ .................................................. B60R 21/22
[52] U.S. Cl. .......................... 280/735; 180/282; 701/45
[58] Field of Search .................................. 280/734, 735, 280/730.2; 180/282, 274; 340/436; 701/45

[56] References Cited

U.S. PATENT DOCUMENTS

| | | | |
|---|---|---|---|
| 5,234,228 | 8/1993 | Morota et al. | 280/735 |
| 5,247,466 | 9/1993 | Shimada et al. | 364/566 |
| 5,338,062 | 8/1994 | Kiuchi et al. | 280/735 |
| 5,483,447 | 1/1996 | Jeenicke et al. | 280/735 |
| 5,513,109 | 4/1996 | Fujishima et al. | 280/735 |
| 5,544,915 | 8/1996 | Fendt et al. | 280/735 |
| 5,620,202 | 4/1997 | Gray et al. | 280/735 |
| 5,732,374 | 3/1998 | Ohm | 280/735 |
| 5,746,444 | 5/1998 | Foo et al. | 280/735 |
| 5,770,997 | 6/1998 | Kleinberg et al. | 280/735 |
| 5,788,273 | 8/1998 | Jeenicke et al. | 280/735 |

FOREIGN PATENT DOCUMENTS

| | | |
|---|---|---|
| 4016644A1 | 11/1991 | Germany . |
| 4220270A1 | 12/1993 | Germany . |
| 4426090A1 | 7/1995 | Germany . |
| 4425846A1 | 1/1996 | Germany . |

OTHER PUBLICATIONS

"Steuerung eines Mehrfach–Rückhaltesystems", Guide Wetzel, ATZ Automobiltechnische Zeitschrift, 96, Oct. 1994, No. 10, Stuttgart, Germany, p. 618–619.

*Primary Examiner*—Paul N. Dickson
*Attorney, Agent, or Firm*—Herbert L. Lerner; Laurence A. Greenberg; Werner H. Stemer

[57] ABSTRACT

An impact sensor configuration in a motor vehicle includes a sensor device in each vehicle half (relative to the longitudinal axis of the vehicle) for detecting an acceleration. Each sensor device has two acceleration sensors with differently directed sensitivity axes.

9 Claims, 1 Drawing Sheet

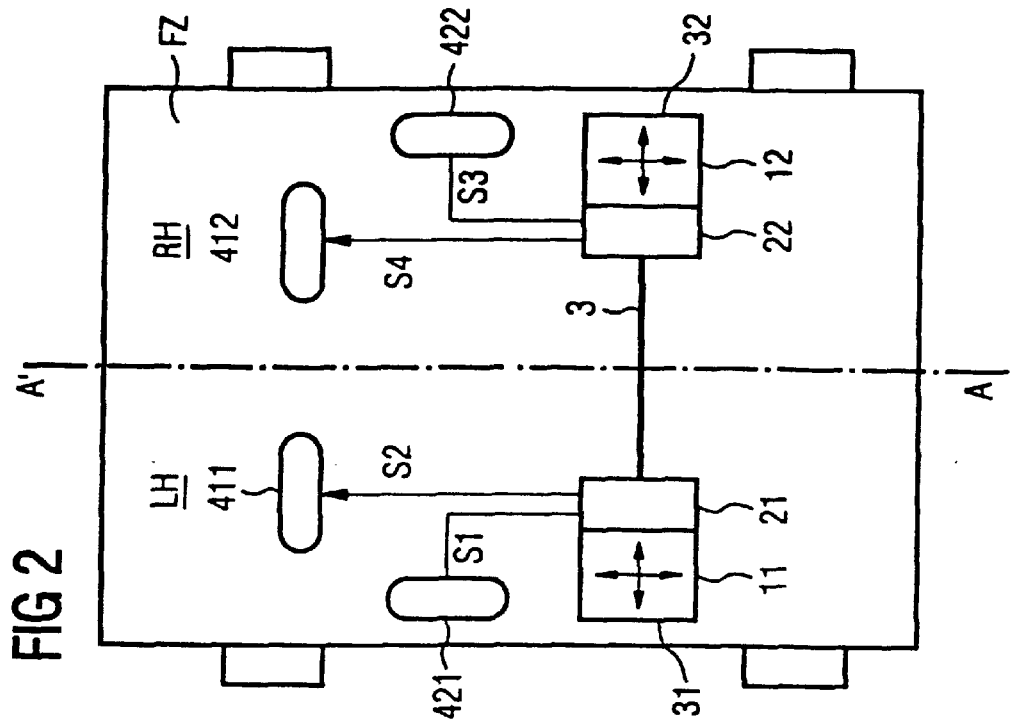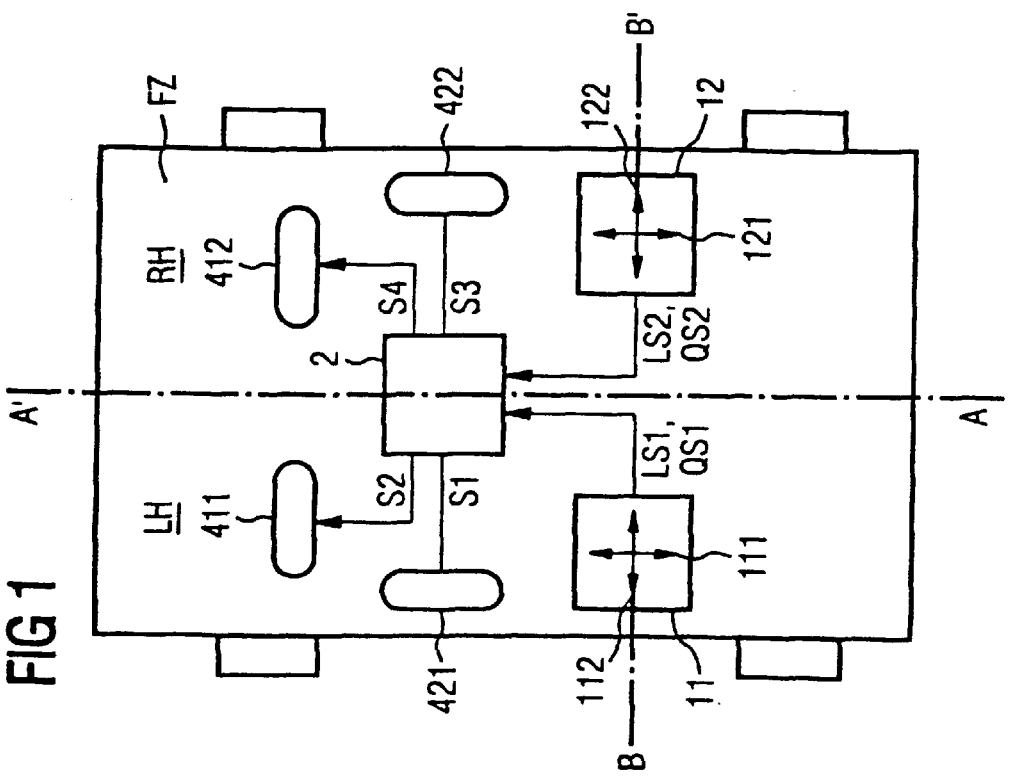

IMPACT SENSOR CONFIGURATION FOR A MOTOR VEHICLE

CROSS-REFERENCE TO RELATED APPLICATION

This is a continuation of copending international application PCT/DE96/02354, filed Dec. 9, 1996, which designated the United States.

BACKGROUND OF THE INVENTION

FIELD OF THE INVENTION

The invention pertains to a motor vehicle sensor configuration for detecting an impact.

Motor vehicle sensor configurations for impact detection or deceleration sensing are generally used in control systems for one or more restraining devices of motor vehicles. Contemporary sensor configurations detect decelerations parallel and transverse to the longitudinal axis of the vehicle. Contemporary occupant protection systems for motor vehicles accordingly have a control configuration with such a sensor configuration, as well as at least one restraint for side impact protection in each vehicle half and at least one restraining means for front impact protection. The first type are preferably side air bags and/or head air bags, the latter includes driver and/or passenger air bag and/or belt tensioner.

An occupant protection system for detecting a side impact is described in the German published non-prosecuted application DE 44 25 846 A1 (published after the international priority date of this invention). That system includes a sensor configuration with a transverse acceleration sensor disposed in each of the side doors that detects vehicle accelerations transverse to the longitudinal axis of the vehicle. For detecting a front impact, the proposed sensor configuration includes two acceleration sensors offset by 45° with respect to the longitudinal axis of the vehicle in a central control device. The central control device has, furthermore, an evaluation circuit, which triggers the restraining device for front impact protection in dependence on the signals of the centrally disposed acceleration sensors and triggers the restraining device for side impact protection in dependence on the signals of the transverse acceleration sensors.

SUMMARY OF THE INVENTION

It is accordingly an object of the invention to provide a motor vehicle impact sensor configuration, which overcomes the above-mentioned disadvantages of the prior art devices and methods of this general type and which ensures reliable triggering and prevents mistaken triggering, with little expenditure on acceleration detectors.

With the foregoing and other objects in view there is provided, in accordance with the invention, an impact sensor configuration for a motor vehicle with two vehicle halves relative to a longitudinal axis of the vehicle, comprising:

a device for detecting an acceleration disposed in each half of a motor vehicle, relative to a longitudinal axis of the vehicle, each of the devices having two acceleration sensors with mutually differently oriented sensitivity axes.

In accordance with an added feature of the invention, each of the devices has a longitudinal acceleration sensor for detecting a vehicle acceleration parallel to the longitudinal axis of the vehicle and a transverse acceleration sensor for detecting a vehicle acceleration transverse to the longitudinal axis of the vehicle.

The sensitivity axes of the acceleration sensors are most suitably oriented in one plane, defined by the longitudinal and transverse axes of the vehicle. As a result, each device is sensitive to impacts acting on the vehicle with decelerations at any angle with respect to the longitudinal axis of the vehicle in this plane, in particular also to impacts from the front (0° with respect to the longitudinal axis of the vehicle) and from the side (90° with respect to the longitudinal axis of the vehicle).

The devices are preferably each a compact component. In this case, the acceleration sensors may be disposed on a common support. Each device thereby preferably has a sealed enclosure, enclosing both the acceleration sensors, for example a sealed housing or a cast casing, by which the acceleration sensors are protected against environmental effects such as moisture or corrosion. Consequently, the devices can be produced in few production steps and using little material.

The devices are distributed about the vehicle, i.e. distinctly decentralized away from the central region of the vehicle for instance at the vehicle tunnel. Consequently, in a side impact from the right, for example, a transverse acceleration sensor of the first device in the left-hand vehicle half delivers a signal which is delayed in comparison with a transverse acceleration sensor disposed in the other device.

In a preferred embodiment the devices are disposed on a vehicle seat. The one device for example on the driver's seat, the other device on the passenger's seat. Alternatively, the devices may be disposed on side parts of the vehicle. The one device for example on the driver's door, the other device on the passenger's door.

The sensor configuration according to the invention detects an oblique impact decentrally, i.e. close to the point of impact, in that, in particular, the respective longitudinal acceleration sensor there detects an oblique acceleration. The attenuation and response time of the decentrally arranged acceleration sensor are distinctly reduced in comparison with a centrally arranged longitudinal acceleration sensor for the oblique impact; the sensor sensitivity in total is thus increased.

A primary advantage of the sensor configuration according to the invention is that it can detect impacts from any direction. Impacts on the motor vehicle from the front, from the side and from the rear as well as oblique impacts at any angle are detected. An impact is detected by both devices irrespective of its direction of impact. The sensor configuration thus makes it possible for the signals of the one device to be used for checking the signals of the other device. In this case, the acceleration sensors are not simply provided in a redundant configuration but are distributed decentrally in the vehicle with a view to optimized signal detection.

The sensor device according to the invention has the effect that signals measured in the vehicle, for front, side and oblique impact, are available at two different locations. Accordingly, additional information on the sequence of an impact can be obtained by time-based evaluation of the signals of the sensors arranged at different locations. For example, it can be determined by such an evaluation how the energy transmitted to the vehicle by an impact is dissipated by the vehicle body over time.

In accordance with another feature of the invention, each device has a longitudinal acceleration sensor for detecting a vehicle acceleration parallel to the longitudinal axis of the vehicle and a transverse acceleration sensor for detecting a vehicle acceleration transverse to the longitudinal axis of the vehicle. Alternatively, acceleration sensors with different angles between their sensitivity axes may also be used. However, the invention is explained below with a view to the embodiment with longitudinal and transverse acceleration sensors.

The impact sensor configuration is most suitably used in a control configuration for a restraining system in a motor vehicle. The system thereby comprises a device for detecting an acceleration disposed in each half of the motor vehicle (relative to the longitudinal axis of the vehicle), each of the devices having two acceleration sensors with mutually differently oriented sensitivity axes and outputting acceleration signals, an evaluation system for evaluating the acceleration signals output by the devices and for generating a control signal for the restraining system of the motor vehicle in dependence on the acceleration signals.

The control configuration for a restraining device in the motor vehicle with the above-described sensor configuration may advantageously be embodied in two exemplary developments:

First, the control configuration has a common evaluation system for all the acceleration signals delivered by the devices. In this case, each acceleration sensor may be connected to the evaluation system via its own electrical line. Preferably, each device is connected to the evaluation system only via a single line, used jointly by both acceleration sensors of a device, for serial data transmission. Data transmission may be effected by the multiplexing method. Preferably, the two devices and the evaluation system are connected via a common data bus for the data transmission from the devices to the evaluation system, but also for the data transmission from the evaluation system to the devices, for example for diagnostic purposes.

In accordance with an additional feature of the invention, the evaluation system is disposed centrally in the motor vehicle. In other words, the evaluation system provided jointly for both devices is preferably designed as a microcomputer disposed centrally in the vehicle. Depending on the location at which other sensors connected to the evaluation system are installed or depending on the location at which the restraining device connected to the evaluation system are installed, a central configuration of the evaluation system in the vehicle is of advantage.

A further advantage of this control configuration is that in the case that one acceleration sensor or an entire device fails, the failed function can be assumed by the corresponding components of the other device.

In accordance with an alternative feature of the invention, the evaluation system includes two evaluation units each assigned to a respective one of the devices. The two evaluation units are connected to each other via a line for code signal transmission.

In accordance with a further feature of the invention, there are provided two control devices each including one of the devices and one of the evaluation units; and wherein one of the two control devices is disposed in the left-hand vehicle half and the other is disposed in the right-hand vehicle half. In other words, there is provided a control device, comprising the respective device and the respective evaluation unit, arranged as a compact component in each vehicle half. The control devices are preferably arranged in the vehicle at the locations proposed before for the devices.

The advantage of this control configuration is that, if one acceleration sensor, an entire device, or else component parts of an evaluation unit fail, then the failed functions can be assumed by the corresponding components of the other control device. Data exchange is carried out via the line between the control devices.

Apart from the data line between the evaluation units, this embodiment of the control configuration requires no further signal lines, specifically no long lines: lines from the transverse acceleration sensors to the central control device or else lines from other sensor systems, for example for seat occupancy detection or for child seat detection, to a central control device are not needed, since in the case of the control configuration according to the invention the control devices are arranged close to these sensor systems—for instance on the vehicle seat. Due to the fact that long lines are susceptible to disturbances or more prone to failure, the reliability of the occupant protection system is improved. Serious consequences for the occupant caused by faulty triggering or non-triggering can be avoided.

In all of the control configurations according to the invention, selected signals or all acceleration signals, or signals derived from them, are evaluated in the associated evaluation system/evaluation unit. For example, the signals may be compared with threshold values and/or algorithmically processed. If the threshold value is exceeded or a trigger criterion is satisfied during the algorithmic processing, the respective restraining device, such as for example a side air bag or a belt tensioner, is triggered. It is also possible, in particular, to select and trigger several restraining devices at time intervals.

The control configuration is most suitably combined into an occupant protection system for a motor vehicle. The system thereby comprises:

a restraining device for side impact protection in each vehicle half and a restraining device for front impact protection, each of the restraining devices being electrically connected to the evaluation system.

In accordance with again a further feature of the invention, the restraining devices for side impact protection and for front impact protection in the left-hand vehicle half are electrically connected to the evaluation unit disposed in the left-hand vehicle half, and the restraining devices for side impact protection and for front impact protection in the right-hand vehicle half are electrically connected to the evaluation unit disposed in the right-hand vehicle half.

The developments of the control configurations according to the invention propose two advantageous occupant protection systems which respectively have the control configuration and associated restraining devices.

In each case, the occupant protection system according to the invention has at least one restraining device for side impact protection in each vehicle half—preferably a side air bag—and at least one restraining device for front impact protection, for example the driver side air bag, but usually a restraining means for front impact protection for each vehicle half—preferably driver and passenger air bags—with the result that best possible all-round protection is ensured for the occupants, irrespective of from which side an impact occurs. The restraining devices are electrically connected to the evaluation system.

The occupant protection system with a common evaluation system for both devices has electrically conducting connections between the evaluation system and the restraining device.

Where the occupant protection system has two evaluation units in different vehicle halves, at least the restraining devices of one vehicle half are electrically connected to the evaluation unit of the same vehicle half. Long signal lines between control devices and actuators, such as in particular the side air bags or belt tensioners, are not needed, since the control devices are disposed spatially close to the actuators. Since, in particular, long lines are susceptible to disturbances, the reliability for the occupant protection system according to the invention is improved and serious consequences for the occupant caused by faulty triggering or trigger failures can be avoided. The occupant protection system according to the invention has the effect that, while retaining all the functional capabilities of the system, in other words the reliable triggering of restraining means for front, oblique and side impact protection, the number and length of lines is reduced in comparison with the prior art occupant protection systems. This increases the dependability of the system and saves in cabling costs.

The following control methods for the restraining devices of the occupant protection system are advantageous:

The restraining device for front impact protection in the left-hand vehicle half is triggered at least in dependence on the longitudinal acceleration signal of the longitudinal acceleration sensor in the left-hand vehicle half. In addition, in an advantageous way, the control or trigger signal is dependent on the longitudinal acceleration signal of the acceleration sensor in the right-hand vehicle half, which sensor consequently assumes a protective function similar to a safing sensor. The control method for the restraining means for front impact protection in the right-hand vehicle half applies correspondingly.

The restraining means for side impact protection in the left-hand vehicle half is triggered at least in dependence on the transverse acceleration signal of the transverse acceleration sensor in the left-hand vehicle half. In addition, the control or trigger signal may be dependent on the transverse acceleration signal of the acceleration sensor in the right-hand vehicle half. The sensor, therefore, assumes the protective function of a safing sensor. The control method for the restraining means for side impact protection in the right-hand vehicle half applies correspondingly.

Each acceleration sensor that is employed as a safing sensor and which is preferably testable, together with an associated evaluation routine, assumes the function of a conventional protective system such as a mechanical acceleration switch, which usually cannot be tested, with a relatively low response threshold, which in any event is lower than a threshold assigned to the relevant sensor. The protective system thus prescribes a time window within which the relevant acceleration sensor must produce a triggering decision. The so-called safing sensor prevents a triggering of the assigned restraining device if the relevant sensor is defective.

On the other hand, one of the longitudinal acceleration sensors may be determined as the relevant sensor for the triggering of all the restraining means for front impact protection. Depending on the longitudinal acceleration signal of this longitudinal acceleration sensor, the restraining device(s) for front impact protection is/are triggered, no matter on which side of the vehicle they are disposed. The other longitudinal acceleration sensor assumes the function of a safing sensor.

In a further development of the invention, the restraining devices of one vehicle half are controlled in dependence on the angle and magnitude of an impact vector which is formed from the longitudinal acceleration signal and the transverse acceleration signal of the corresponding sensors in the same vehicle half. The vector calculation is preferably also carried out for the sensor signals of the sensors in the other vehicle half and consequently the result of the sensors in the first vehicle half is checked. As a protective function, triggering is prevented if the vector results of the two vehicle halves do not approximately match.

Where the sensor signals originating at the sensors that are remote from the location of impact are included in the triggering decision for restraining devices at the area of the impact—a protective function against mistaken triggering—it must be taken into consideration that those remote sensors deliver signals which are time-delayed and attenuated in a manner dependent on the vehicle body.

If the occupant protection system has a common evaluation system for both devices, then the above-described control methods are carried out by the evaluation system.

If the occupant protection system has an evaluation unit for each device, then the individual calculations are distributed between the evaluation units: preferably, each evaluation unit assumes the evaluation of the sensor signals of the sensors assigned to it. The evaluation results are transmitted via the data line to the other evaluation unit and they are further processed there in accordance with the control method. Alternatively, selected sensor signals may also be transmitted from the one evaluation unit to the other.

Other features which are considered as characteristic for the invention are set forth in the appended claims.

Although the invention is illustrated and described herein as embodied in a motor vehicle sensor configuration for detecting an impact, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic plan view of a motor vehicle with an occupant protection system according to the invention; and FIG. 2 is a similar schematic view with a further embodiment of the occupant protection system according to the invention.

DESCRIPTION OF THE PREFERRED EMBODIMENTS

Referring now to the figures of the drawing in detail, wherein the same elements are identified by the same designations throughout, and first, particularly, to FIG. 1 thereof, there is seen an motor vehicle FZ with an occupant protection system according to the invention. A longitudinal axis of the vehicle is indicated at A–A' and the transverse axis of the vehicle is indicated at B–B'. In the left-hand and right-hand vehicle halves LH and RH, there is disposed a device 11 and 12, respectively, for detecting acceleration. Each device 11 includes a longitudinal acceleration sensor 111 and 121, respectively, and a transverse acceleration sensor 112 and 122, respectively. The sensitivity axes of the acceleration sensors 111, 112; 121, 122 are indicated by arrows.

The following signals are delivered by the devices 11 and 12 to an evaluation system 2, which is disposed centrally in the vehicle FZ, whereby each device 11 and 12 is connected to the evaluation system 2 via a only one line: a first longitudinal acceleration signal LS1 of the first longitudinal acceleration sensor 111, a first transverse acceleration signal QS1 of the first transverse acceleration sensor 112, a second longitudinal acceleration signal LS2 of the second longitudinal acceleration sensor 121 and a second transverse acceleration signal QS2 of the second transverse acceleration sensor 122.

The evaluation system 2 outputs control signals S1, S2, S3 and S4 according to prescribed control methods to a driver side air bag 411, a left-hand side air bag 421, a passenger air bag 412 and a right-hand side air bag 422.

FIG. 2 likewise shows a vehicle FZ with an occupant protection system according to the invention. The devices 11 and 12 for detecting an acceleration correspond to those from FIG. 1. Each device 11 and 12 is electrically connected to an evaluation unit 21 and 22, respectively, assigned to it and disposed in its vicinity. One device 11 and 12 and one evaluation unit 21 and 22 together form a respective control device 31 and 32. The evaluation unit 21 in the left-hand vehicle half LH is electrically connected to the driver air bag 411 and the levft-hand side air bag 421, the evaluation unit 22 in the right-hand vehicle half is electrically connected to the passenger air bag 412 and the right-hand side air bag 422. The evaluation units 21 and 22 are electrically connected to each other via a line 3. The line 3 may be a CAN bus. Further control devices may be connected to one another and further data may be exchanged via the line 3.

We claim:

1. An impact sensor configuration for a motor vehicle having a first motor vehicle door and a second motor vehicle door and a longitudinal axis, the impact sensor configuration comprising:

a first device for detecting an acceleration and a second device for detecting an acceleration, said first device disposed adjacent a first motor vehicle door and said second device disposed adjacent a second motor vehicle door, the second motor vehicle door being opposite the first motor vehicle door, said first device and said second device each having two acceleration sensors with mutually differently oriented sensitivity axes.

2. The sensor configuration according to claim 1, wherein said two acceleration sensors include a longitudinal acceleration sensor for detecting a vehicle acceleration parallel to the longitudinal axis of the vehicle and a transverse acceleration sensor for detecting a vehicle acceleration transverse to the longitudinal axis of the vehicle.

3. In combination with a control configuration for a restraining system in a motor vehicle having a first motor vehicle door and a second motor vehicle door, an impact sensor configuration, comprising:

a first device for detecting an acceleration and a second device for detecting an acceleration, said first device disposed adjacent a first motor vehicle door and said second device disposed adjacent a second motor vehicle door, the second motor vehicle door being opposite the first motor vehicle door, said first device and said second device each having two acceleration sensors with mutually differently oriented sensitivity axes and outputting acceleration signals; and an evaluation system for evaluating the acceleration signals output by said first device and said second device and for generating a control signal for a restraining system of the motor vehicle in dependence on the acceleration signals.

4. The control configuration according to claim 3, wherein said evaluation system is disposed centrally in the motor vehicle.

5. The control configuration according to claim 3, wherein said evaluation system includes two evaluation units each assigned to a respective said device, and wherein said two evaluation units are connected to each other via a line for code signal transmission.

6. The control configuration according to claim 5, which further comprises:

two control devices each including one of said devices and one of said evaluation units; and wherein one of said two control devices is disposed in the left-hand vehicle half and another of said two control devices is disposed in the right-hand vehicle half.

7. An occupant protection system for a motor vehicle with the control configuration according to claim 3, which comprises:

a restraining device for side impact protection and a restraining device for front impact protection disposed in a right-hand vehicle half, a restraining device for side impact protection and a restraining device for front impact protection disposed in a left-hand vehicle half, said restraining devices being electrically connected to said evaluation system.

8. The occupant protection system according to claim 7, wherein said evaluation system includes an evaluation unit disposed in the left-hand vehicle half and an evaluation unit disposed in the right-hand vehicle half, said restraining devices for side impact protection and for front impact protection in the left-hand vehicle half are electrically connected to said evaluation unit disposed in the left-hand vehicle half, and said restraining devices for side impact protection and for front impact protection in the right-hand vehicle half are electrically connected to said evaluation unit disposed in the right-hand vehicle half.

9. An occupant protection system for a motor vehicle with the control configuration according to claim 8, wherein said evaluation unit disposed in the left-hand vehicle half is electrically connected to said evaluation unit disposed in the right-hand vehicle half via a line for code signal transmission.

* * * * *